United States Patent
Seck et al.

(10) Patent No.: US 12,187,642 B2
(45) Date of Patent: Jan. 7, 2025

(54) METHOD FOR MANUFACTURING INSULATION PRODUCTS BASED ON MINERAL WOOL

(71) Applicant: SAINT-GOBAIN ISOVER, Courbevoie (FR)

(72) Inventors: Mamadou Seck, Creil (FR); Mickael Delmee, Wavignies (FR); Pierrick Guyot, Montrouge (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 358 days.

(21) Appl. No.: 17/791,309

(22) PCT Filed: Jan. 5, 2021

(86) PCT No.: PCT/FR2021/050008
§ 371 (c)(1),
(2) Date: Jul. 7, 2022

(87) PCT Pub. No.: WO2021/140295
PCT Pub. Date: Jul. 15, 2021

(65) Prior Publication Data
US 2023/0027973 A1 Jan. 26, 2023

(30) Foreign Application Priority Data
Jan. 9, 2020 (FR) ...................................... 2000151

(51) Int. Cl.
*C03C 25/26* (2018.01)
*B29C 70/28* (2006.01)

(52) U.S. Cl.
CPC .............. *C03C 25/26* (2013.01); *B29C 70/28* (2013.01)

(58) Field of Classification Search
None
See application file for complete search history.

(56) References Cited

U.S. PATENT DOCUMENTS

| 10,941,073 | B2 | 3/2021 | Ruisi et al. |
| 2010/0192636 | A1* | 8/2010 | Valero ................. D04H 1/4218 210/765 |
| 2012/0263934 | A1 | 10/2012 | Jaffrennou et al. |

FOREIGN PATENT DOCUMENTS

| CN | 109071335 A | 12/2018 |
| CN | 110650928 A | 1/2020 |
| EP | 1182177 A1 * | 2/2002 |
| EP | 2646386 B1 | 9/2018 |
| RU | 2648096 C1 | 3/2018 |
| WO | WO-2018206129 A1 | 11/2018 |

OTHER PUBLICATIONS

Office Action issued Mar. 23, 2023 in Saudi Arabian Patent Application No. 522433242, 12 pages (with English translation).
Combined Chinese Office Action and Search Report issued Oct. 25, 2023 in corresponding Chinese Patent Application No. 202180008320.X (with English translation of the Office Action only), 15 pages.
International Search Report issued Apr. 29, 2021 in PCT/FR2021/050008 (with English translation), 5 pages.

* cited by examiner

*Primary Examiner* — Mohammad M Ameen
(74) *Attorney, Agent, or Firm* — Element IP, PLC

(57) ABSTRACT

The invention relates to a method for manufacturing insulation products based on mineral wool bound by an organic binder, comprising the following successive steps:
  (a) providing mineral wool at room temperature,
  (b) applying, to the mineral wool, an aqueous thermosetting binder composition,
  (c) drying the mineral wool impregnated with the aqueous thermosetting binder composition to obtain thermosetting mineral wool,
  (d) shaping the thermosetting mineral wool, and
  (e) heating the shaped thermosetting mineral wool at a temperature for long enough to enable the constituents of the binder to be condensed and an insoluble binder to be formed.

18 Claims, No Drawings

METHOD FOR MANUFACTURING INSULATION PRODUCTS BASED ON MINERAL WOOL

The present invention relates to a method for manufacturing insulation products based on mineral wool bound by an organic binder, comprising the preparation of dry, non-sticky, thermosetting mineral wool, and the thermosetting of this mineral wool, optionally after blending with virgin and/or recycled mineral wool or with natural organic fibers.

The manufacture of insulation products based on mineral wool generally comprises a step of manufacturing glass or rock fibers by a method of centrifugation of molten glass or molten rock (fiberizing). The newly formed fibers are carried by a stream of hot air to a conveyor belt which collects them (forming) and transports them through a curing oven. On the path between the centrifugation device (fiberizing) and the fiber collecting belt, an aqueous thermosetting binder composition is sprayed onto the fibers, which subsequently undergoes a thermosetting reaction at temperatures of about 200° C. in the curing oven.

The aqueous binder compositions are diluted aqueous solutions, with low viscosity, of monomer reagents, oligomer and/or polymer resins. They are sprayed onto the still-hot, newly formed mineral fibers by means of a spray ring located downstream of the centrifugation device, in the immediate vicinity of the latter.

When the fibers are collected and assembled as a mat (or loft) on the collecting belt, they are sticky and the binder composition film that surrounds the mineral fibers still contains water.

Only when the sized mineral wool mat enters the temperature-controlled curing oven is the evaporation of the water completed and the condensation reaction of the binder reagents begins.

An installation for manufacturing insulation products based on mineral wool bound by organic binders, which operates in the manner described above (spraying of binder composition onto the still-hot fibers, partial evaporation of water, formation of a mat of sticky fibers, curing of the mat of sticky fibers in the oven), necessarily comprises a system for washing the installation, in particular a system for washing the forming chamber and the collecting belt. Indeed, the high tack of the still-wet sized fibers, conveyed in a stream of hot air between the fiberizing device and the conveyor belt, leads to soiling of the walls of the forming chamber, the conveyor belt and the suction device located below it.

The wash water is recycled in a closed circuit, filtered, neutralized and reused for the manufacture of binder solutions and for the washing of production equipment. The system for washing the production installation and the recycling of the wash water in a closed circuit represent an important fraction of the investment and operating costs of a production installation for insulation products based on bound mineral wool.

The present invention aims to propose a method for manufacturing insulation products based on mineral wool bound by an organic binder which does not comprise a step during which mineral fibers sized by a binder composition, partially dried and sticky, are conveyed by means of a stream of air between the fiberizing device and the zone for forming a mat.

In the method for manufacturing insulation products of the present invention, the binder composition is not applied to still-hot, newly formed mineral fibers, but to mineral fibers at room temperature (that is to say, in thermal equilibrium with the surrounding environment). The sized mineral fibers are then dried at a temperature high enough to allow the complete or almost-complete evaporation of the water and the disappearance of the sticky nature of the fibers. The drying temperature is, however, less than the crosslinking onset temperature of the binder reagents.

At the end of the drying step implemented at a temperature less than the crosslinking temperature of the binder, mineral fibers surrounded by a layer of dried binder are thus obtained. The dried binder is no longer sticky. It is however thermosetting, that is to say that it contains the binder reagents and is capable of polymerizing and/or crosslinking and of forming an insoluble binder. The terms "thermosetting mineral wool" and "binding fibers" will be used indistinctly hereafter to refer to these mineral fibers, sized with an organic binder, dried, not sticky and having retained their capacity to set by crosslinking when heated to a high enough temperature.

The present invention is based on the discovery that the layer of dried binder, which is not sticky, still made it possible to bind the mineral fibers together when a set of fibers was heated to a temperature high enough to trigger the condensation of the reagents of the dried binder.

In the method for manufacturing mineral wool of the present invention the thermosetting mineral wool is then shaped, optionally after blending with non-thermosetting mineral wool, and undergoes a curing step. During this curing step, the dried binder is first softened, then melted, which promotes the adhesion of the fibers among each other, then the reagents of the binder polymerize and crosslink so as to form an insoluble, non-melting organic binder.

At no point in the method of the present invention is the mineral wool freshly sized with the aqueous binder composition conveyed by a stream of hot air. It is thus not likely to adhere massively to the equipment for forming the mat of mineral wool and the method can operate without a system of wash water operating in a closed circuit. In the method of the present invention the mineral wool sized with the aqueous binder composition first undergoes drying before being transported, optionally blended with other fibers, shaped and cured in an oven.

The present invention thus relates to a method for manufacturing insulation products based on mineral wool bound by an organic binder, comprising the following successive steps:
(a) providing mineral wool at room temperature,
(b) applying, to the mineral wool, an aqueous thermosetting binder composition,
(c) drying the mineral wool impregnated with the aqueous thermosetting binder composition to obtain thermosetting mineral wool,
(d) shaping the thermosetting mineral wool, and
(e) heating the shaped thermosetting mineral wool at a temperature for long enough to enable the constituents of the binder to be condensed and an insoluble binder to be formed.

The first step of the method thus consists of providing mineral wool at room temperature. The term "at room temperature" does not designate a particular temperature or temperature range, but means that the mineral fibers are in thermal equilibrium with their immediate environment. The mineral fibers thus are not mineral fibers in the process of cooling, exiting the step of fiberizing by centrifugation of molten glass or molten rock. "Room temperature" is typically comprised between 15° C. and 30° C., in particular between 18° C. and 25° C.

The mineral wool provided in step (a) can be virgin mineral wool. The term "virgin mineral wool" designates in the present application mineral wool, in particular glass wool or rock wool, obtained by internal or external centrifugation, in which the fibers are not bound to one another by means of an organic binder. Such virgin mineral wool is typically used as wool to be blown for attic insulation. The fibers of virgin mineral wool can be coated with a thin layer of sizing or lubricant.

The mineral wool provided in step (a) can also be recycled mineral wool. The term "recycled mineral wool" herein designates mineral wool consisting of mineral fibers having on their surface an insoluble, non-melting organic binder, which is already crosslinked.

Naturally, the mineral wool provided in step (a) can be a blend of virgin mineral wool and recycled mineral wool, in any respective proportions.

The following step of the method of the invention consists of applying to the virgin and/or recycled mineral wool an aqueous binder composition. This is advantageously an aqueous solution of the components of the binder, capable of reacting with one another to form a crosslinked polymeric network that is insoluble and non-melting.

The application of the binder composition can be done by any appropriate means known per se, for example by spraying, by roller coating or by immersing the mineral fibers in an aqueous binder composition.

The aqueous binder composition thus advantageously has a low enough viscosity to be able to be applied to the mineral fibers by spraying, or to allow the impregnation of mineral wool by immersion in the aqueous binder composition.

As explained hereinbefore, during the step of applying the aqueous binder composition (step (b)), the mineral wool is preferably at room temperature. The same applies to the aqueous binder composition.

The aqueous binder composition advantageously has a solids content comprised between 1 and 10%, preferably between 1.5 and 8%, and in particular between 2 and 7% by weight.

After applying the aqueous binder composition, the sized mineral wool undergoes a drying step (step (c)) which aims to evaporate enough water to make the sized fibers substantially non-sticky.

This drying step can be implemented by heating, for example in a temperature-controlled ventilated oven, or else by irradiating with infrared or microwave radiation. It is important to ensure that the drying does not heat the mineral wool fibers to an excessively high temperature that results in the softening of the dried binder, or in the onset of crosslinking of the components of the binder. A heating temperature close to the boiling point of water is generally enough.

The drying of mineral wool impregnated with aqueous binder composition (step (c)) is thus carried out preferably by heating to a temperature comprised between 60 and 110° C., in particular between 70 and 100° C. The fibers of the mineral wool obtained at the end of the drying step are surrounded by a sheath of dried organic binder. When the wettability of the virgin/recycled wool by the aqueous binder composition is not very high, the sheath of organic binder may be irregular and droplets of dried binder may be visible under the microscope.

The mineral wool obtained after drying (step (c)) is referred to in the present application as "thermosetting mineral wool". This term thus designates the mineral wool formed by mineral fibers having on their surface a water-soluble, dry solid binder, containing reagents which, when they are heated to a temperature greater than a given value (crosslinking onset temperature), are capable of polymerizing and/or crosslinking and of forming an insoluble binder. The fibers that constitute this thermosetting mineral wool are also referred to as "binding fibers"

The thermosetting mineral wool generally comprises 3 to 20% by dry weight, preferably 4 to 18% by dry weight, in particular 5 to 15% by dry weight, of thermosetting binder. It is important to note than when the mineral wool provided in step (a) is recycled mineral wool already containing a certain fraction of crosslinked organic binder, the percentages hereinbefore do not encompass the amounts of crosslinked organic binder present on the fibers before applying the binder composition. The loss on ignition (LOI) of the thermosetting mineral wool may thus be greater than the content of thermosetting dried organic binder.

In a preferred embodiment the method of the present invention further comprises, between step (c) of drying and step (d) of shaping, a step of blending thermosetting mineral wool (binding fibers) with virgin mineral wool and/or with recycled mineral wool and/or with natural organic fibers (non-binding fibers).

The natural organic fibers are non-thermoplastic fibers, of plant or animal origin. The plant fibers are preferably selected from the group consisting of lignocellulosic fibers and cotton fibers. The lignocellulosic fibers are preferably selected from wood fibers, hemp fibers, flax fibers, sisal fibers, cotton fibers, jute fibers, coco fibers, raffia fibers, abaca fibers, cereal straw or rice straw. The animal fibers are preferably selected from the group consisting of animal wools, such as sheep's wool.

This blending can in principle be implemented by any appropriate mechanical and/or pneumatic means. The inventors have found that the mechanical properties of the final insulation products were better the longer the blending method preserved the length of the blended mineral fibers. Indeed, when the blending step leads to a considerable reduction in the size of the fibers, this results in less mineral fiber entanglement and lower tensile strength of finished products. In a preferred embodiment of the method of the invention, the blend of binding fibers and non-binding fibers is implemented by means of a stream of compressed air passing through a swirl chamber. Such a device makes it possible indeed to obtain highly regular blends without excessively reducing the length of the fibers.

When the blend of the two types of fibers uses a pneumatic means it is important to ensure that the stream of compressed air is at a low enough temperature to prevent a possible softening of the organic binder.

Indeed, in a preferred embodiment of the method of the invention, the dried organic binder forming the organic sheath surrounding the fibers of the thermosetting mineral wool has thermoplastic behavior, that is to say, it softens or liquefies when it is heated to a certain temperature, referred to hereinafter as "softening temperature" or "glass transition temperature", determined by differential scanning calorimetry (DSC). This softening temperature is greater than the drying temperature but less than the crosslinking onset temperature of the binder. This softening advantageously grants a certain tack to the fibers which thus become capable of adhering to one another and also to non-binding mineral fibers (virgin/recycled mineral wool) or to natural organic non-binding fibers, optionally present. The inventors have observed that whereupon the dry organic binder fluidifies enough when hot, it migrates even from the fibers of thermosetting mineral wool to the fibers of the virgin/recycled mineral wool or to the natural organic fibers. When inspecting under optical microscopy the insulation products obtained by blending 50% by weight of thermosetting mineral wool and 50% by weight of virgin mineral wool, the inventors have observed the presence of organic binder on all the fibers and not only on half of them.

The respective proportions of thermosetting mineral fibers (binding fibers) and virgin/recycled mineral fibers or natural organic fibers can vary within rather broad ranges. These ranges are dependent, among others, on the homogeneity of the blend of fibers and on the thermosetting binder content of the binding fibers. The greater the uniformity of the blend and the higher the thermosetting binder content of the binding fibers, the higher the proportion of non-binding virgin/recycled fibers or natural organic fibers can be.

Generally, 100 parts by weight of thermosetting mineral wool is blended with 10 to 400 parts by weight, preferably with 20 to 300 parts by weight, in particular with 30 to 200 parts by weight of virgin and/or recycled mineral wool (non-binding mineral wool) or natural organic fibers.

In a particularly advantageous embodiment, the method for manufacturing insulation products based on mineral wool bound by an organic binder thus comprises the following seven successive steps:
   providing mineral wool at room temperature,
   applying, to the mineral wool, an aqueous thermosetting binder composition,
   drying the mineral wool impregnated with the aqueous thermosetting binder composition to obtain thermosetting mineral wool,
   blending the thermosetting mineral wool with virgin and/or recycled mineral wool or with natural organic fibers,
   shaping the blend of thermosetting mineral wool and virgin and/or recycled mineral wool or natural organic fibers, and
   heating the shaped blend at a temperature for long enough to enable the constituents of the binder to crosslink and an insoluble binder to be formed.

The step of shaping the thermosetting mineral wool (or the blend of thermosetting mineral wool and virgin and/or recycled mineral wool or natural organic fibers) is preferably carried out by molding and/or compression. The mold used for molding the products must be made of a material capable of withstanding the temperature of the thermosetting step. It must also have a structure that allows the hot air from the curing oven to easily penetrate the molded product. The mold can for example consist of a box-shaped metal screen. The metal-screen box is preferably filled with a volume of loose thermosetting mineral wool that is greater than its capacity and is then closed by a metal-screen cover. The thermosetting mineral wool thus is more or less compressed depending on the excess filling volume. This excess filling volume of the box by the thermosetting mineral wool is for example comprised between 10% and 150%, preferably between 15 and 100% and in particular between 20 and 80%.

When the method of the present invention is a continuous method, the shaping of the thermosetting mineral wool can be done for example by compression by means of a roller located at the inlet of the curing oven on a conveyor.

The step of setting the shaped thermosetting mineral wool by heating it at a temperature for long enough to enable the constituents of the binder to be condensed (polymerization/crosslinking) and an insoluble binder to be formed is carried out under conditions that are familiar to a person skilled in the art. When the method is a continuous method, the curing oven is advantageously identical to the oven of a line for manufacturing insulation products of the prior art, wherein very hot compressed air is passed through the mat of mineral wool.

The heating temperature of step (e) is advantageously comprised between 130° C. and 240° C., preferably between 180° C. and 230° C., in particular between 190° C. and 220° C. The heating time is advantageously comprised between 30 seconds and 15 minutes, preferably between 1 minute and 10 minutes, in particular between 2 and 8 minutes.

It is easy to adjust the density and the thickness of the insulation products based on mineral wool obtained by the method of the present invention by varying the compression rate of the thermosetting mineral wool during the curing step. The insulation products generally have a density comprised between 4 and 150 kg/m$^3$, preferably between 5 and 60 kg/m$^3$, in particular between 6 and 40 kg/m$^3$. Their thickness is generally comprised between 20 mm and 500 mm, advantageously between 40 mm and 300 mm, preferably between 50 mm and 200 mm, and in particular between 60 mm and 150 mm.

The method for manufacturing insulation products based on mineral wool disclosed hereinbefore can in principle be implemented with any thermosetting organic binder currently used in the field of mineral wools.
   Examples of such binders include those that are
   based on resole resins (phenol-formaldehyde), preferably modified with urea,
   based on Maillard reagents (reducing sugars and amines),
   based on acrylic polymers and crosslinking agents such as polyhydroxylated and polyaminated reagents,
   based on non-reducing sugars and/or hydrogenated sugars and polycarboxylated reagents, such as citric acid,
   based on aminoamides obtained by reaction of carboxylic anhydrides and alkanolamines.

The binder is preferably formaldehyde-free and advantageously comprises biosourced reagents, renewable in the short term. In one advantageous embodiment, the aqueous binder composition comprises more than 50% by dry weight of biosourced reagents.

These biosourced reagents are selected for example from saccharides and saccharide hydrogenation products. The aqueous binder compositions additionally contain a crosslinking agent that is typically a polycarboxylic acid, preferably citric acid. The reaction between the saccharides and the saccharide hydrogenation products and the polycarboxylic acid is advantageously catalyzed by a catalyst, especially by sodium hypophosphite (HPS).

Thermosetting binder systems for mineral wool based on reducing saccharides, non-reducing saccharides and/or hydrogenated sugars and polycarboxylic acids are disclosed in detail in international applications WO2009/080938, WO2010/029266, WO2013/014399, WO2013/021112 and WO2015/132518 in the name of the applicant.

To the applicant's knowledge, the intermediate product obtained at the end of step (c) of the method of the invention, that is to say the thermosetting mineral wool formed from mineral fibers surrounded by a dry, thermosetting organic layer, in thermal equilibrium with their environment, has not been disclosed beforehand in the prior art.

As a result, the present application also relates to loose thermosetting mineral wool containing binding mineral fibers surrounded by a dry layer of thermosetting organic binder and, optionally, non-binding fibers. This mineral wool is loose, that is to say that it consists of individual fibers that can interlace, but which do not adhere to one another so as to form a mat of fibers.

This thermosetting mineral wool is not sticky because the organic binder layer on the surface of the fibers does not contain water and thus is not an aqueous viscous composition of an organic binder.

Furthermore, this thermosetting mineral wool is in thermal equilibrium with its environment, that is to say that it is not in the process of cooling (for example after fiberizing) or heating (for example in the oven).

The thermosetting mineral wool of the present invention is a stable intermediate product that can be stored, transported and transformed under environmental conditions of temperature and relative humidity.

It can consist exclusively of binding fibers (mineral fibers surrounded by a layer of thermosetting organic binder) or else contain both binding fibers and non-binding fibers. In the latter case, the non-binding fibers are advantageously selected from fibers of virgin mineral wool and/or fibers of recycled mineral wool and/or natural organic fibers, as defined and disclosed hereinbefore.

When the loose thermosetting mineral wool of the present invention is a blend of binding fibers and non-binding fibers it generally comprises 10 to 400 parts by weight, preferably 20 to 300 parts by weight, in particular 30 to 200 parts by weight of virgin and/or recycled mineral wool (non-binding mineral wool) or natural organic fibers per 100 parts by weight of thermosetting mineral wool.

The invention claimed is:

1. A method for manufacturing an insulation product comprising mineral wool bound by an organic binder, the method comprising the following successive steps:
   (a) providing mineral wool at room temperature;
   (b) applying, to the mineral wool, an aqueous thermosetting binder composition;
   (c) drying the mineral wool impregnated with the aqueous thermosetting binder composition, to obtain thermosetting mineral wool;
   (d) shaping the thermosetting mineral wool; and
   (e) heating the shaped thermosetting mineral wool at a temperature for long enough to enable the constituents of the binder to be condensed and an insoluble binder to be formed.

2. The method according to claim 1, wherein the mineral wool provided in step (a) is virgin mineral wool or recycled mineral wool, or a blend of virgin mineral wool and recycled mineral wool.

3. The method according to claim 1, wherein during the step of applying the aqueous binder composition the mineral wool is at room temperature.

4. The method according to claim 1, further comprising, between step (c) and step (d):
   blending the thermosetting mineral wool with virgin mineral wool and/or with recycled mineral wool and/or with natural organic fibers.

5. The method according to claim 4, wherein the natural organic fibers are plant fibers or animal fibers.

6. The method according to claim 4, wherein 100 parts by weight of thermosetting mineral wool are blended with 10 to 400 parts by weight of virgin mineral wool and/or recycled mineral wool and/or natural organic fibers.

7. The method according to claim 1, wherein the drying of mineral wool impregnated with aqueous binder composition in (c) is carried out by heating to a temperature comprised between 6° and 110° C.

8. The method according to claim 1, wherein the thermosetting mineral wool comprises 3 to 20% by dry weight of thermosetting binder.

9. The method according to claim 1, wherein an insulation product obtained in (e) has a density comprised between 4 and 150 kg/m$^3$.

10. The method according to claim 1, wherein an insulation product obtained in (e) has a thickness comprised between 20 mm and 500 mm.

11. The method according to claim 1, wherein the aqueous binder composition comprises more than 50% by dry weight of a biosourced reagent.

12. The method according to claim 11, wherein the biosourced reagent is at least one selected from the group consisting of a saccharides and a saccharide hydrogenation product.

13. The method according to claim 1, wherein the shaping of the thermosetting mineral wool in (d) is carried out by molding and/or compressing the thermosetting mineral wool.

14. The method according to claim 1, wherein the heating temperature in (e) is comprised between 130° C.

15. The method according to claim 4, wherein the natural organic fibers are blended with the thermosetting mineral wool and the natural organic fibers are at least one selected from the group consisting of lignocellulosic fibers, cotton, and animal wools.

16. The method according to claim 4, wherein 100 parts by weight of thermosetting mineral wool are blended with 20 to 300 parts by weight of virgin mineral wool and/or recycled mineral wool and/or natural organic fibers.

17. The method according to claim 7, wherein the temperature of the heating is comprised between 7° and 100° C.

18. The method according to claim 1, wherein the thermosetting mineral wool comprises 4 to 18% by dry weight of thermosetting binder.

* * * * *